No. 607,870. Patented July 26, 1898.
J. J. MERRILL.
MACHINE FOR PRESSING CLAY PRODUCTS.
(Application filed Sept. 1, 1897.)
(No Model.) 4 Sheets—Sheet 1.
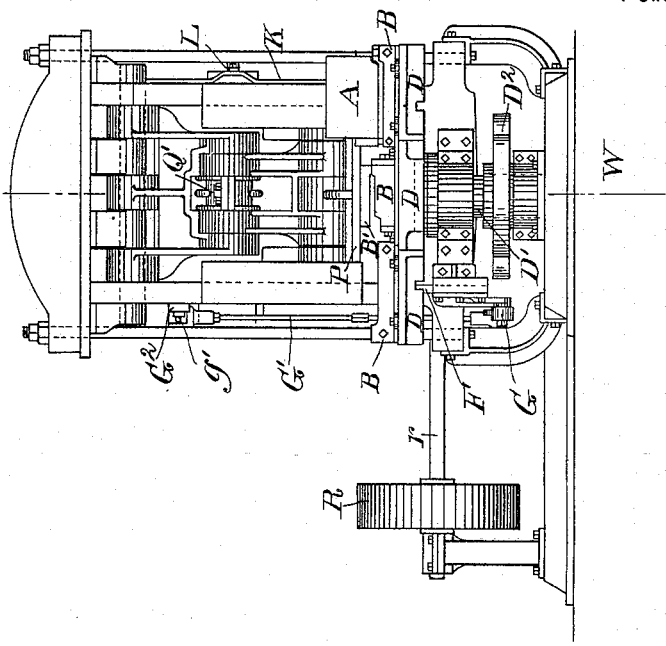
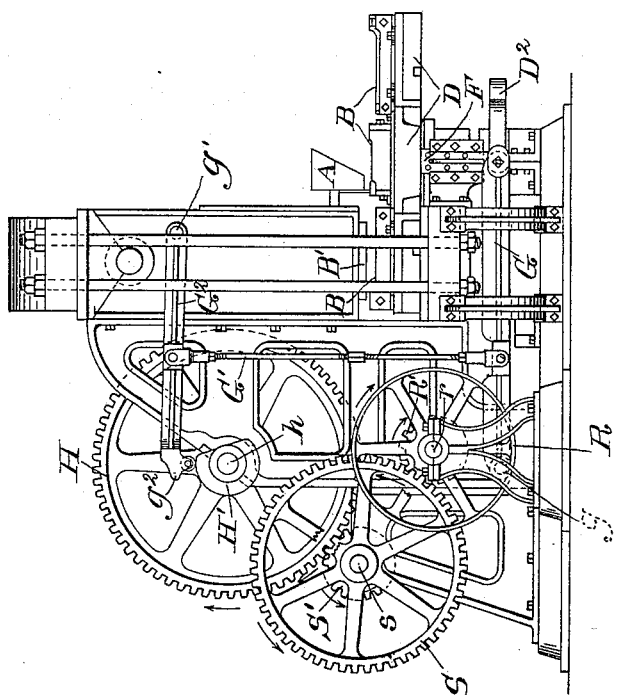
Witnesses: Inventor,
J. W. Fisher. John J. Merrill
by Ward & Cameron
Attorneys.

No. 607,870. Patented July 26, 1898.
J. J. MERRILL.
MACHINE FOR PRESSING CLAY PRODUCTS.
(Application filed Sept. 1, 1897.)
(No Model.) 4 Sheets—Sheet 2.
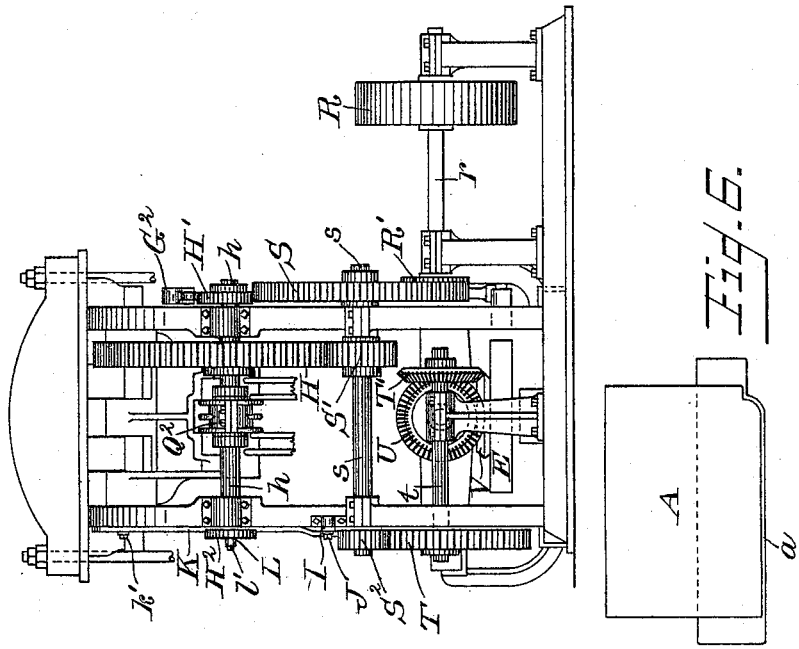
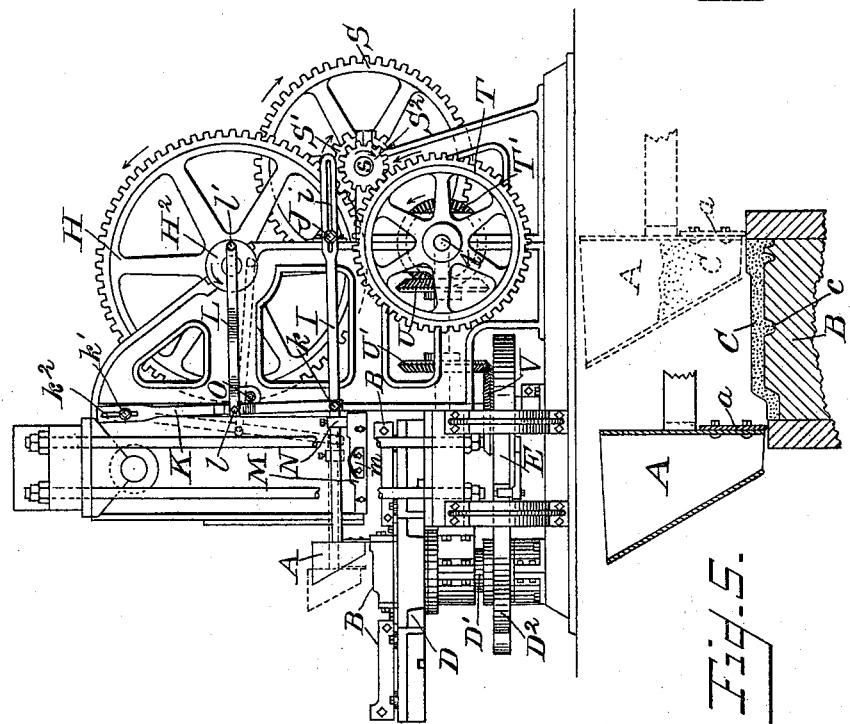
Witnesses:
J. W. Fisher.
Inventor,
John J. Merrill
by Ward & Cameron
Attorneys.

No. 607,870. Patented July 26, 1898.
J. J. MERRILL.
MACHINE FOR PRESSING CLAY PRODUCTS.
(Application filed Sept. 1, 1897.)
(No Model.) 4 Sheets—Sheet 3.
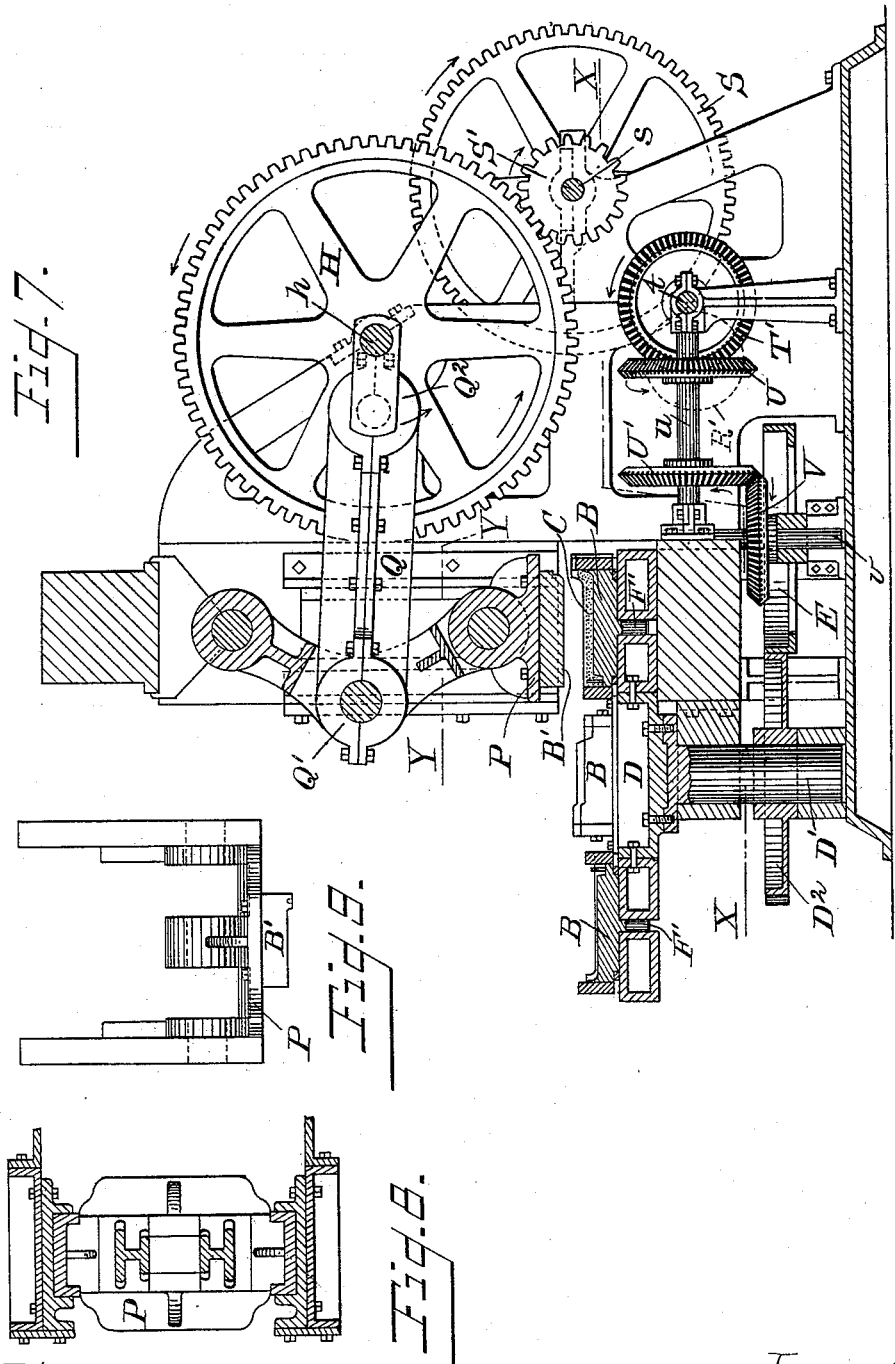
Witnesses:
J. W. Fisher.
Julius Illch
Inventor:
John J. Merrill
by Ward & Cameron
Attorneys.

No. 607,870. Patented July 26, 1898.
J. J. MERRILL.
MACHINE FOR PRESSING CLAY PRODUCTS.
(Application filed Sept. 1, 1897.)
(No Model.) 4 Sheets—Sheet 4.

Witnesses:
J. W. Fisher.

Inventor;
John J. Merrill
by Ward & Cameron
Attorneys.

UNITED STATES PATENT OFFICE.

JOHN J. MERRILL, OF ALFRED, NEW YORK.

MACHINE FOR PRESSING CLAY PRODUCTS.

SPECIFICATION forming part of Letters Patent No. 607,870, dated July 26, 1898.

Application filed September 1, 1897. Serial No. 650,244. (No model.)

*To all whom it may concern:*

Be it known that I, JOHN J. MERRILL, a citizen of the United States, residing at Alfred, in the county of Allegany and State of New York, have invented a new and useful Machine for Pressing Clay Products, of which the following is a specification.

My invention relates to improvements in machines for pressing clay and analogous products, especially such as have irregular form, as roofing-tile; and the objects of my invention are to produce a machine so constructed and arranged that it will, first, press clay products in a dry or semidry condition; second, automatically feed and distribute the material for irregular forms; third, automatically feed and distribute the material for one form, press another, while still another is being removed from the die and another die is being cleaned and oiled, all at the same time, and, fourth, automatically raise the lower die from the mold-box, so as to leave the form free for removal above the case of the die. I attain these objects by the mechanism illustrated in the accompanying drawings, in which—

Figure 11:
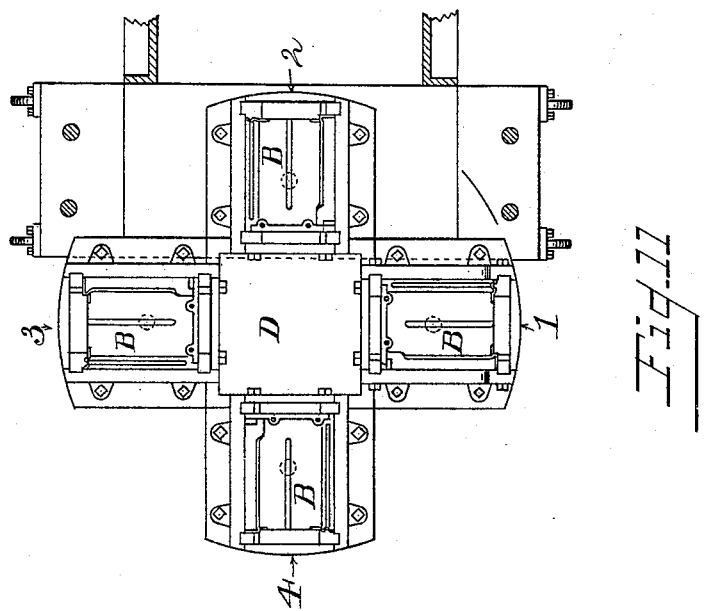
Figures 10, 12:
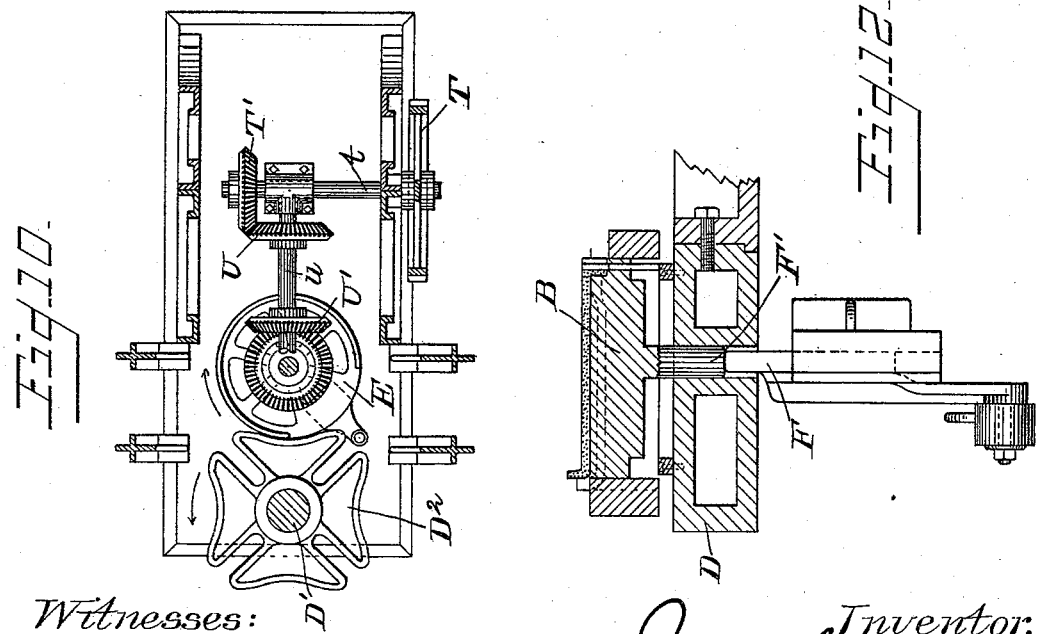

Figure 1 is a side elevation of my machine; Fig. 2, a front elevation; Fig. 3, a side elevation of the side opposite from that shown in Fig. 1; Fig. 4, a rear elevation; Fig. 5, a detail view of the distributer for feeding and distributing the material upon the die; Fig. 6, a front view of the distributer; Fig. 7, a longitudinal section of the machine on line W W of Fig. 2; Fig. 8, a horizontal section on line Y Y of Fig. 7; Fig. 9, a front elevation of the follower of the press that carries the upper die; Fig. 10, a horizontal section on line X X of Fig. 7; Fig. 11, a plan view of the revolving table and quarter-blocks to carry the lower die from the distributer to the pressure-block and so on around; and Fig. 12, a detailed sectional view through one arm or quarter-block of the table and mold-box, showing the manner in which the lower die is raised in order to remove the form therefrom after it is pressed.

Similar letters refer to similar parts throughout the several views.

A is a distributer by and through which the material C is fed upon the lower die preparatory to being pressed.

B is the lower die of the pair of dies in which the material is pressed, and B' is the upper die. There is but one upper die and this attached to the bottom of the follower of the press, as shown in Figs. 7 and 9, and moves through sufficient space to allow when raised the lower die with the material to be pressed to pass under it and after being pressed to pass on from under it. There may be several lower dies to match the upper die and arranged to pass in succession under it.

My machine, as here shown, is constructed with four lower dies mounted on an intermittently-revolving table D, Fig. 11, each quarter-block or arm of the table being provided with a mold box or case to hold one of the lower dies. This table is revolved by means of spider and fly wheels, as shown in Fig. 10, in which D' is the center post or shaft bearing the table D. Thus each revolution of the fly-wheel E causes the table to revolve one-quarter way around and carries one of the lower dies out from under the upper die and the next lower die to its place, ready for the material upon it to be pressed into form. After the material has been pressed into form and the upper die has been raised the revolving table carries the lower die, with the pressed form, over the plunger or post F, Fig. 12, which is arranged to act against the pin F', which is arranged to act against the bottom of the die containing the pressed form, so that when the plunger F is raised it raises the pin F', which forces upward the die with the pressed form, so that the form will be above the sides of the mold-box and may be readily removed, and as the pin F' passes off of the plunger F on the next quarter-revolution of the table the die will fall back into its place in its mold-box by its own weight and the pin F' be returned to its position. The plunger F is raised and lowered by the arm G, Fig. 1, which is pivoted at one end $g$ to the frame of the machine and the other end left movable and is raised by the rod G', which is raised by the arm $G^2$, which is pivoted at one end $g'$ to the frame of the machine and raised and lowered by the other end $g^2$, working over the cam H', attached to one end of the shaft $h$. The wheel H is mounted upon and turns the said shaft $h$. The dies may be made of any conformation necessary to produce the form into which it is desired to press the material. The accompanying drawings show the dies of the proper formation to produce my improved roofing-tile, which have ribs and grooves, elevations and depressions, both lengthwise and crosswise.

The material to be pressed is dry or so nearly dry that it must be distributed over the lower dies in the varying quantities required by inequalities of the form to be produced. This is accomplished by feeding the material upon the die by means of the distributer A, which is in width equal to the length of the die to be covered and passes over the entire surface of the die. This movement is accomplished by attaching the distributer A to one end of movable arm I, Fig. 3, the other end of which is fastened to the frame of the machine by the bolt J, passing through the slot $i$ in that end of the arm, the slot $i$ and bolt J being of proper sizes and proportions to allow the arm I to move back and forth to carry the distributer over the die B. The arm I is held in position and moved back and forth by the reciprocating arm K. One end of the arm K is attached to the arm I by the pivot $k$ and the other end to the frame of the machine by the bolt $k'$ through the slot $k^2$, so as to allow the arm K to have a limited vertical motion and also a horizontal motion. The reciprocating horizontal movement of the arm K is caused by the arm L, one end of which is pivoted to the arm K by the pivot $l$ and the other end pivoted to the wheel $H^2$, which is mounted upon the opposite end of the shaft $h$ from that carrying the cam H'. The arm L is attached to the wheel $H^2$ out of its center by the crank-pin $l'$ and forms a pitman to reciprocate the arm K. When the wheel H and its shaft $h$ are revolved, the pitman or arm L will be moved in the direction of the arm K and will move the arm K in the same direction, and by the same movement the arm K will carry the arm I in the direction of the die B, and thus carry the distributer A over the said die. The material C in the distributer A will thus be distributed over the die B by this movement, as shown in Figs. 3 and 5. The length of this movement is arranged to correspond to the size of the die to be fed.

The distributer A, as usually made and used upon the machine, has its bottom open. The material, sufficient for one form only at a time, is measured out and placed in the distributer while over the die in the position shown by the dotted lines in Fig. 3. The die itself keeps the material from falling out until the distributer moves over the face of the die, when all of the material in the distributer is used up and distributed. A plate or former $a$ is fastened to the back of the distributer A and extending slightly below it, which is so provided with depressions or elevations as to leave more or less material on the surface of the die in the direction of travel of the distributer, as may be required to produce the desired formation. The quantities of material required by the desired inequalities in the thickness of the form in the direction crosswise from the direction of travel of the distributer are regulated by the formation of the top surface of the plate M, over which the slide N, bearing the weight of the arm I on its outward movement, slides while the distributer is feeding the die. The slide N is attached to the arm I by a set-screw, and the general thickness of the form C is regulated by the distance the bottom of the slide N is made to extend below the arm I. The higher the arm I is above the plate M the higher the distributer will be above the die B and the thicker the material will be spread over the die. Where an additional quantity of material is required, as for a rib, as $c$ in Fig. 5, a projecting plate, as $m$, Fig. 3, may be fastened to the plate M. The slide N, passing over the projection $m$, will raise the distributer that much and so deposit that much more material at that place, and the opposite result will take place if the slide N passes into a depression in the plate M. When the wheel H has revolved one-half way around from the position and in the direction shown in Fig. 3, the distributer will then be at its farthest point from the body of the machine and will be beyond the edge of the die, having passed over the entire surface of the die. As the wheel continues to revolve the arm L is carried downward and comes in contact with the pin O, Fig. 3. The pin O prevents the arm L from descending, the pin O being attached to the frame of the machine and extending out sufficiently for that purpose. The wheel H, continuing to revolve, carries the end of the arm L attached to it downward until it assumes the position shown by the dotted lines. In the meanwhile it has slid over the pin O and acted as a lever, with the pin O as a fulcrum, and raised the arm K, which has raised the arm I, which has raised the distributer to the position shown by the dotted lines. By this means the distributer is raised free from the die, moved back by the continued revolution of the wheel H to its original position, ready to feed the next die, which likewise during the same time has moved into place to be fed. The pressing of the material after it is properly distributed upon the die is performed by a toggle-joint press, as shown in Fig. 7. After the material is distributed upon the lower die and the quarter-revolution of the table has brought it upon the pressure-block under the press it is pressed into form by the toggle-joint press, as there shown. The upper die B' of the pair is attached to the bottom of the follower P, so that it will cooperate with the die B when the arms of the press are straightened.

The press is operated by the arm or rod Q, one end of which, Q', is attached to the toggle-joint of the press, and the other end, $Q^2$, is attached eccentrically to a bend or elbow in the shaft $h$, forming a crank, so that the revolution of the wheel H produces a crank movement which reciprocates the arm Q. Thus when the wheel H is in the position shown in Fig. 7 the press will be open and the follower P, carrying the upper die, will be raised to its highest point. As the wheel H revolves, the arms of the press will straighten and the follower will descend and press the material between the dies, the greatest pressure being exerted when the wheel is one-half-way around. As the wheel continues in its revolution the connecting-arm Q forces the arms of the press back and raises the press again to the position shown. By the arrangement of the gears great power is given to the wheel H, so that the press exerts an immense pressure upon the material, which is thus pressed into forms which are so strong as to be readily handled and set up on their sides to be burned, and when burned are perfectly impervious to water. The dies may be heated, if desired, in any suitable manner to facilitate the removal of the forms therefrom.

The operation of the machine so far as not already fully described is as follows: The power is applied to the wheel R. The wheel R turns the shaft $r$, which carries and turns the cog-wheel R'. The cog-wheel R' drives the cog-wheel S, which is mounted upon and turns the shaft $s$, which shaft carries and turns the cog-wheels S' and $S^2$. The cog-wheel S' drives the wheel H, which turns the shaft $h$, upon which it is mounted, and which shaft carries and turns the eccentric H' and the crank or pitman wheel $H^2$. The cog-wheel $S^2$ drives the cog-wheel T, which is mounted upon and turns the shaft $t$, which turns the beveled cog-wheel T', mounted upon it. The beveled cog-wheel T' drives the beveled cog-wheel U, which is mounted upon and turns the shaft $u$, which shaft turns the beveled cog-wheel U', which is mounted upon it. The beveled cog-wheel U' drives the beveled cog-wheel V, which is mounted upon and turns the shaft $v$, which turns the fly-wheel E, which is mounted upon it. The fly-wheel E, as before described, turns the spider-wheel $D^2$, which is mounted upon and turns the shaft or post D' of the intermittingly-revolving table D, which table D is mounted upon and turns with the shaft or post D'. These various wheels and shafts are so constructed and arranged that the fly-wheel E will make one complete revolution to each revolution of the wheels H and $H^2$ and shaft $h$ and cam H', thus causing the table D to make one-quarter revolution to the other parts of the machine performing a complete movement, so that the table will remain stationary three-fourths of the time while the other operations are going on. These movements are so timed that the table will present one quarter-block with its die to the distributer to be fed; the second quarter-block, with its die covered with material ready to be pressed, under the press; the third quarter-block, with its die holding the pressed form ready to be removed, over the plunger, which is to force the die upward, and the fourth quarter-block to the operator to cleanse and oil the die, ready to be fed again. These four operations are going on at the same time and while the fly-wheel E is performing three-fourths of its revolution and the table is at rest. When the fly-wheel E commences again to move the spider-wheel $D^2$, the follower of the press has commenced to rise, the distributer has commenced to lift up and move back to its original position, and the arms G G' $G^2$ have dropped, so as to release the plunger F and allow the die to fall back into its place in the mold-box, and by the time the table has moved its quarter-revolution the other portions of the machine are ready to repeat their operations.

My machine thus constructed will perform more operations and more work in a more rapid, economical, and satisfactory manner than any press for clay products known to me.

What I claim as my invention, and desire to secure by Letters Patent, is—

1. In a machine for pressing clay and analogous products, an automatically intermittently revolving table, carrying four or more molds and automatically presenting them each successively to be fed, pressed, emptied, and cleaned and oiled, to the end that each of the four operations may be going on at the same time, together with an automatically-reciprocating distributer and means for operating it, an upwardly-movable lower die of a pair of dies, mounted in a box upon said table, the box, and a plunger adapted to move said die upwardly above the plane of the side of the box, substantially as described and for the purpose set forth.

2. In a machine for pressing clay and analogous products a movable distributer, a die, a vertically-movable reciprocating arm, adapted to automatically move the distributer over the surface of the die to be fed and means for raising said arm with the distributer free from the die on its backward movement, substantially as described, and for the purposes set forth.

3. In a machine for pressing clay and analogous products an automatically-reciprocating distributer, an irregular-shaped former attached thereto and extending slightly below its under surface, adapted to distribute the material in unequal portions in one direction across the die, together with its operating mechanism substantially as described and for the purposes set forth.

4. In a machine for pressing clay and analogous products a vertically-movable distributer, a die, an automatically-reciprocating arm, an irregular plate adapted to raise or lower said distributer, thereby causing the material to be distributed in unequal quantities in one direction across the surface of the die substantially as described, and for the purposes set forth.

5. In a machine for pressing clay and analogous products a vertically-movable distributer, an irregular-shaped former attached to and extending slightly below its under surface, adapted to distribute the material in unequal quantities in one direction across the surface of the die, a die, an automatically-reciprocating arm, connected to the distributer, an irregular plate adapted to raise or lower said distributer thereby distributing the material in varying quantities in the other direction across the surface of the die, with means for reciprocating the arm, substantially as described and for the purposes set forth.

6. In a machine for pressing clay and analogous products a die, movably contained in a mold-box, mounted upon a movable table, with an open space underneath said die, in combination with an automatically-operated vertically-movable plunger, F, adapted to operate through the open space of said table upon the under surface of said die, the arm G, adapted to operate against and raise the said plunger, a vertical rod G', connecting the said arm G with the arm $G^2$, the horizontal arm, $G^2$, with one end adapted to operate in connection with the cam H', the cam H', adapted to raise and lower one end of the said arm $G^2$, and means for operating the same, all substantially as described and for the purposes specified.

7. In a machine for pressing clay products, the combination of a toggle-joint press consisting of an upper and lower arm, the upper arm hinged to the head-block of the press and the follower attached to the lower arm, the head-block, the follower, an upper die of a pair of dies attached to the bottom of the follower, a reciprocating arm attached at one end to the toggle-joint and to a crank-shaft at the other end, the crank-shaft and means for operating the same, together with an intermittently-revolving table and its operating mechanism, an automatically-reciprocating distributer and means for operating it, an upwardly-movable lower die of the pair of dies, mounted in a box upon said table, the box, and a plunger adapted to move said die upwardly above the plane of the side of its box, all substantially as described and for the purposes set forth.

JOHN J. MERRILL.

Witnesses:
WALTER E. WARD,
J. W. FISHER.